United States Patent Office 3,661,841
Patented May 9, 1972

3,661,841
FLAME RETARDANT POLYMERS
James L. Dever, Lewiston, and James J. Hodan, Williamsville, N.Y., assignors to Hooker Chemical Corporation, Niagara Falls, N.Y.
No Drawing. Original application June 14, 1967, Ser. No. 645,873, now Patent No. 3,522,331. Divided and this application Apr. 20, 1970, Ser. No. 38,615
Int. Cl. C09k 3/28
U.S. Cl. 260—45.8 R           10 Claims

ABSTRACT OF THE DISCLOSURE

Compounds are described of the structure

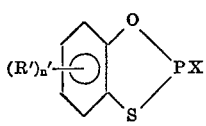

wherein R' is selected from the group consisting of alkyl of 1 to 18 carbon atoms, aryl of 6 to 12 carbon atoms and cyclohexyl; X is a halogen selected from the group consisting of chlorine, bromine and iodine; and $n'$ ranges from 0 to 4. The compounds are prepared by reacting an orthomercaptophenol compound with phosphorus trihalide. The resulting compounds can be used to impart fire retardancy to plastic compositions, in particular polystyrene.

---

This is a division of our parent application, Ser. No. 645,873, filed June 14, 1967, now U.S. Pat. 3,522,331.

THE SPECIFICATION

This invention is directed to novel compounds useful as flame retardants for plastics, such as polystyrene, polypropylene, polyethylene, polyvinyl halides—as polyvinyl chloride, for example, and the like.

BACKGROUND

The U.S. Pat. 2,744,128 discloses a cyclic monoxymonothia-(monochloro phosphite) produced from a monohydroxymonothia-alkylene compound, or substituted form thereof, in reaction with phosphorus trichloride. This patent is limited expressly to alkylene compounds as a reactant, and is directed to the production of these compounds solely for use as a particular intermediate in the production of a more complex compound by reaction with an ac,tylenic hydrocarbon, such as acetylene or one of its homologues or a halogen-substituted acetylenic hydrocarbon, in the presence of a catalyst such as mercuric sulfate. Accordingly, the U.S. Pat. 2,744,128 fails to make obvious the novel compounds and the novel uses of the compounds of this invention.

Although the U.S. Pat. 3,172,871 discloses 4-benzo-2-chloro-1,3-dioxa-2-phospholene, there is no disclosure nor suggestion of the novel properties and uses of the novel compounds of this invention and also there is no disclosure nor suggestion of the novel compounds of this invention which are cyclic compounds of monoxy-monothio phenolics such as mercaptophenol.

Accordingly, an object of this invention is novel compounds derived from mercaptophenolic-type reactants.

Another object is utilities of said novel compounds characterized by novel properties.

Other objects become apparent from the above and following disclosure.

THE INVENTION

The objects of this invention are obtained by a compound of the formula:

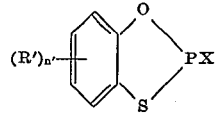

in which R' is selected from the group consisting of alkyl, substituted alkyl, aryl, substituted aryl, cycloalkyl, and fused-ring aryl, in which X is a halogen selected from the group consisting of chlorine, bromine, and iodine, and in which $n'$ ranges from 0 to 4. In preferred embodiments of this invention, the monohalide is a chloride or bromide, preferably a chloride and the compound is derived from an orthomercaptophenol.

Typical examples of the mercaptophenolic derivatives of this invention include those derived from orthomercaptophenol, substituted forms thereof, including the polycyclic compounds thereof, and including, for example, compounds in which R' represents a part of a fused-ring compound either substituted on the mercaptophenolic compound or as a part of a fused-ring mercaptophenolic compound.

Typical examples of alkyl values of R' include methyl, ethyl, propyl, butyl, hexyl, decyl, octadecyl, and the like, including also for example the cyclic compounds such as cyclohexyl, and substituted forms thereof.

Typical aryl values of R', as discussed above, include for example, phenyl, naphthyl, anthrecenyl, and other conventional aryl substituents, including also, for example, the substituted forms of these groups. Typical compounds representative of the above generic formula of the novel compounds of this invention typically include:

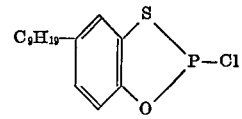

4,5-(4'-nonyl)benzo-2-chloro-1-oxa-3-thia-2-phospholane

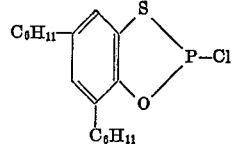

4,5-(4',6'-dicyclohexyl)benzo-2-chloro-1-oxa-3-thia-2-phospholane

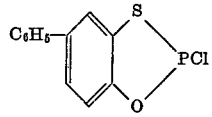

4,5-(4'-phenyl)benzo-2-chloro-1-oxa-3-thia-2-phospholane

In a typical process for the production of the novel compounds of this invention, phosphorus trichloride is reacted with an orthomercaptophenol at a reflux temperature for a period of normally about 13 or 14 hours after which the solvent is stripped therefrom, preferably at reduced pressure, and the residue is preferably distilled, whereby a yield ranging normally from about 92 percent to about 95 percent is obtained based on the weight of orthomercaptophenol reactant employed. It should be noted that obviously this process is merely illustrative and that the temperature ranges and times involved, as well as the particular mercaptophenolic reactant employed may include many obvious equivalents and modifications in range. It should be noted however, that by the employment of a process similar to that described above, a high conversion as noted above may advantageously be obtained.

The following examples are intended to illustrate the invention and do not limit the invention except to the extent that the appended claims are limited, or otherwise stated. In the following examples, all percentages are by weight, and temperatures are expressed in degrees centigrade unless otherwise stated.

Example I

A two liter flask is charged with 236.0 g. (1.87 moles) of o-mercaptophenol, 600 ml. of diethyl ether, 3 ml. of water, and 385 g. (2.81 moles) of phosphorus trichloride. The resulting solution is heated at reflux for about 13.5 hours, the solvent is stripped at reduced pressure, and the residue is distilled to yield 331.9 g. (93.3% conversion based on o-mercaptophenol), B.P. 80–82° at 0.9 mm.

*Analysis.*—Calc'd for $C_6H_4ClOPS$ (percent): C, 37.80; H, 2.11; Cl, 18.63; P, 16.28; S, 16.83. Found (percent): C, 37.60; H, 2.27; Cl, 18.73; P, 16.24; S, 16.57.

Example II

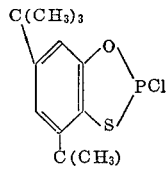

4,5-(4',6'-di-t-butyl)benzo-2-chloro-1-oxa-3-thia-2-phospholane

A 500 ml. flask is charged with 65.1 g. (0.273 mole) of 2,4-di-t-butyl-6-mercaptophenol, 85 ml. of diethyl ether, and 0.4 ml. of water. Then 56.4 g. (0.41 mole) mole of $PCl_3$ is added dropwise in 0.3 hour and the mixture then is refluxed for about ten hours. After removal of the solvent and excess $PCl_3$ at reduced pressure, distillation of the residue yields 58.2 g. (70.5%) of colorless product, B.P. 114–119° at 0.3–0.45 mm. having the following analysis.

Calc'd for $C_{14}H_{20}ClOPS$ (percent): Cl, 11.71; P, 10.23; S, 10.59. Found (percent): Cl, 11.94; P, 10.44; S, 10.69.

Example II thus illustrates a use of a substituted mercaptophenol.

Example III

A dry blend of thermoplastic power and flame retardant(s) is melt blended in a beaker at a temperature suitable for the thermoplastic (e.g. 200° C. for polystyrene). The blended melt is diced while hot and, after cooling, is packed into a 7 mm. diameter glass tube sealed at one end. The loaded tube is then placed in the thermal bath to remelt the charge and a plunger is inserted in the tube to compress the charge. The tube is removed from the bath and allowed to cool under plunger pressure. When cool, the glass is chipped away from the molding to produce the pencil rod for flammability studies.

Flammability is tested by placing a ¾" flame against the end of the horizontally suspended pencil rod molding for 30 seconds. Flame out should be under 45 seconds on an average of three tests to be considered passing.

The following blend is put through the above indicated procedure.

3.7 g. of polystyrene
1.5 g. of 4,5-benzo-2-chloro-1-oxa-3-thia-2-phospholane
0.8 g. of antimony oxide The pencil rod from this blend gives the flameouts of 10, 42, and 3 seconds in three consecutive tests for a flame-out average of 18 seconds. The antimony oxide is a standard additive in flame-retardant systems and cannot of itself cause flame-out.

Example III illustrates a utility of this compound as a flame-retardant. The method employed for evaluation is the standard "pencil rod" molding and flammability test.

It is to be understood that the specification, including the examples are only illustrative of the invention claimed herein, and that it is within the scope of this invention to employ equivalent obvious equivalents obvious to one skilled in the art. Any limitations appearing in the preceding disclosure are not intended to limit this invention except insofar as limitations are stated to be important or otherwise appear in the appended claims.

We claim:
1. A composition comprising a plastic selected from the group consisting of polystyrene, polypropylene, polyethylene and polyvinyl halide, and an amount, sufficient to impart flame retardancy, of a compound of the formula:

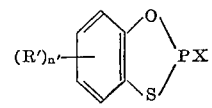

in which R' is selected from the group consisting of:
  (a) alkyl of 1 to 18 carbon atoms;
  (b) aryl of 6 to 12 carbon atoms; and
  (c) cyclohexyl; and
wherein X is a halogen selected from the group consisting of chlorine, bromine and iodine, and n' ranges from 0 to 4.

2. A composition according to claim 1 in which said halogen is selected from the group consisting of chlorine and bromine.

3. The composition of claim 2 wherein said halogen is chlorine.

4. The composition of claim 1 wherein R' is alkyl of 1 to 18 carbon atoms.

5. A composition according to claim 1 wherein n' is 0.

6. A composition according to claim 1 wherein said compound is 4,5-benzo-2-chloro-1-oxa-3-thia-2-phospholane.

7. A composition according to claim 1 wherein said compound is 4,5-(4'-nonyl)benzo-2-chloro-1-oxa-3-thia-2-phospholane.

8. A composition according to claim 1 wherein said compound is 4,5-(4',6'-dicyclohexyl)benzo-2-chloro-1-oxa-3-thia-2-phospholane.

9. A composition according to claim 1 wherein said compound is 4,5-(4'-phenyl)benzo-2-chloro-1-oxa-3-thia-2-phospholane.

10. A composition according to claim 1 in which said plastic is polystyrene.

References Cited

UNITED STATES PATENTS

| | | | |
|---|---|---|---|
| 2,898,735 | 8/1959 | Carmody et al. | 60—35.4 |
| 3,305,607 | 2/1967 | Sherr et al. | 260—893 |
| 3,399,171 | 8/1968 | Vogt et al. | 260—47 |
| 3,459,835 | 8/1969 | Dever et al. | 260—927 |

DONALD E. CZAJA, Primary Examiner

R. A. WHITE, Assistant Examiner

U.S. Cl. X.R.

106—15 FP; 252—8.1; 260—45.75